United States Patent
Tanabe et al.

(10) Patent No.: US 9,691,196 B2
(45) Date of Patent: Jun. 27, 2017

(54) DATA REPRODUCING APPARATUS

(71) Applicant: FUJITSU TEN LIMITED, Kobe-shi, Hyogo (JP)

(72) Inventors: Toshio Tanabe, Kobe (JP); Kohei Ono, Kobe (JP); Haruki Shiraishi, Kobe (JP); Munenori Maeda, Kobe (JP); Lin Li, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 14/962,431

(22) Filed: Dec. 8, 2015

(65) Prior Publication Data

US 2016/0191886 A1 Jun. 30, 2016

(30) Foreign Application Priority Data

Dec. 25, 2014 (JP) .................. 2014-261602

(51) Int. Cl.
| | |
|---|---|
| *G07C 5/06* | (2006.01) |
| *B60R 1/00* | (2006.01) |
| *H04N 5/77* | (2006.01) |
| *H04N 5/907* | (2006.01) |
| *G08G 1/0962* | (2006.01) |
| *G08G 1/16* | (2006.01) |

(52) U.S. Cl.
CPC ............. *G07C 5/06* (2013.01); *B60R 1/00* (2013.01); *G08G 1/0962* (2013.01); *G08G 1/166* (2013.01); *H04N 5/77* (2013.01); *H04N 5/907* (2013.01); *B60R 2300/301* (2013.01); *B60R 2300/305* (2013.01); *B60R 2300/8093* (2013.01)

(58) Field of Classification Search
None
See application file for complete search history.

(56) References Cited

U.S. PATENT DOCUMENTS

| | | | |
|---|---|---|---|
| 2005/0065687 A1* | 3/2005 | Hijikata | ............... G01S 17/936 701/41 |
| 2011/0298602 A1* | 12/2011 | Chen | ..................... B60Q 9/008 340/435 |

(Continued)

FOREIGN PATENT DOCUMENTS

| | | |
|---|---|---|
| JP | H10-116400 A | 5/1998 |
| JP | 2001-191877 A | 7/2001 |
| JP | 2006-309552 A | 11/2006 |

(Continued)

*Primary Examiner* — Eileen Adams
(74) *Attorney, Agent, or Firm* — Oliff PLC

(57) ABSTRACT

A data reproducing apparatus that reproduces moving image data that is captured while a vehicle is traveling includes a controller configured to: derive a stoppable distance that the vehicle requires to come to a stop based on a speed of the vehicle obtained while the vehicle was traveling during an image-capturing time period in which the moving image data was captured; derive an inter-vehicle distance between the vehicle and a preceding vehicle located ahead of the vehicle during the image-capturing time period in which the moving image data was captured; and superimpose, on an object image generated from the moving image data, a first mark which shows a position corresponding to the stoppable distance and a second mark which shows a position corresponding to the inter-vehicle distance.

15 Claims, 11 Drawing Sheets

(56) References Cited

U.S. PATENT DOCUMENTS

2012/0253629 A1* 10/2012 Maruyama ............... G08G 1/22
                                                    701/96
2014/0005859 A1* 1/2014 Baskin ............... G07C 9/00309
                                                    701/2

FOREIGN PATENT DOCUMENTS

| JP | 2007-141178 A | 6/2007 |
| JP | 2008-225908 A | 9/2008 |
| JP | 2011-091667 A | 5/2011 |

* cited by examiner

DATA REPRODUCING APPARATUS

BACKGROUND OF THE INVENTION

Field of the Invention

The invention relates to a technology for reproducing moving image data captured while a vehicle is traveling.

Description of the Background Art

Conventionally, well-known drive recorders periodically acquire still images showing a vicinity of a vehicle, using a camera, and in a case where a particular event occurs while the vehicle is traveling, the well-known drive recorders capture moving image data based on a plurality of still images acquired before and after the particular event (an accident or an event possibly resulting in an accident).

Recently, some business operators that run a business using multiple business vehicles, such as trucks, busses, and taxies, install drive recorders in all those vehicles for the business.

Data reproducing apparatuses are installed in offices of those business operators. The data reproducing apparatuses retrieve the moving image data captured by the drive recorder in each vehicle and reproduce the moving image data. The business operators understand a situation in which the event occurred, based on such moving image data, and utilize the moving image data for driver safety guidance and other purposes.

There is a case where a user of the data reproducing apparatus desires to determine, during an image-reproducing time period in which the moving image data is reproduced, whether or not an inter-vehicle distance has been appropriate during an image-capturing time period in which the moving image data was captured. Therefore, some scale marks may be superimposed, as rough indications for showing a distance (10 m, 20 m, etc.) from the vehicle to an image of an object in front of the vehicle included in the moving image data.

However, a distance that the vehicle requires to come to a stop changes every second, depending on a speed of the vehicle. Thus, even if the user sees the scale marks as a reference, the user cannot intuitively understand whether or not the inter-vehicle distance has been appropriate.

SUMMARY OF THE INVENTION

According to one aspect of the invention, a data reproducing apparatus reproduces moving image data that is captured while a vehicle is traveling. The data reproducing apparatus includes a controller configured to: derive a stoppable distance that the vehicle requires to come to a stop based on a speed of the vehicle obtained while the vehicle was traveling during an image-capturing time period in which the moving image data was captured; derive an inter-vehicle distance between the vehicle and a preceding vehicle located ahead of the vehicle during the image-capturing time period in which the moving image data was captured; and superimpose, on an object image generated from the moving image data, a first mark which shows a, position corresponding to the stoppable distance and a second mark which shows a position corresponding to the inter-vehicle distance.

Since the two marks that show the position corresponding to the stoppable distance and the position corresponding to the inter-vehicle distance are superimposed on the object image during the image-reproducing time period in which the moving image data is reproduced, respectively, a user can intuitively understand whether or not the inter-vehicle distance has been appropriate.

According to another aspect of the invention, the controller changes a form of at least one of the first and second marks depending on whether the inter-vehicle distance is greater or smaller than the stoppable distance.

The user can more intuitively understand whether or not the inter-vehicle distance has been appropriate.

According to another aspect of the invention, the controller is further configured to determine whether or not a predetermined event has occurred during the image-capturing time period in which the moving image data was captured. In a case where the predetermined event has occurred during the image-capturing time period, the controller superimposes the first and second marks on the object image.

In the case where the predetermined event has occurred during the image-capturing time period in which the moving image data was captured, the user can intuitively understand whether or not the inter-vehicle distance has been appropriate.

Therefore, an object of the invention is to provide a technology with which a user can intuitively understand whether or not an inter-vehicle distance has been appropriate.

These and other objects, features, aspects and advantages of the invention will become more apparent from the following detailed description of the invention when taken in conjunction with the accompanying drawings.

DESCRIPTION OF THE EMBODIMENTS

An embodiment of the invention is described with reference to the drawings.

<1. First Embodiment>

<1-1. Configuration of Data Reproducing Apparatus>

Figure 1:
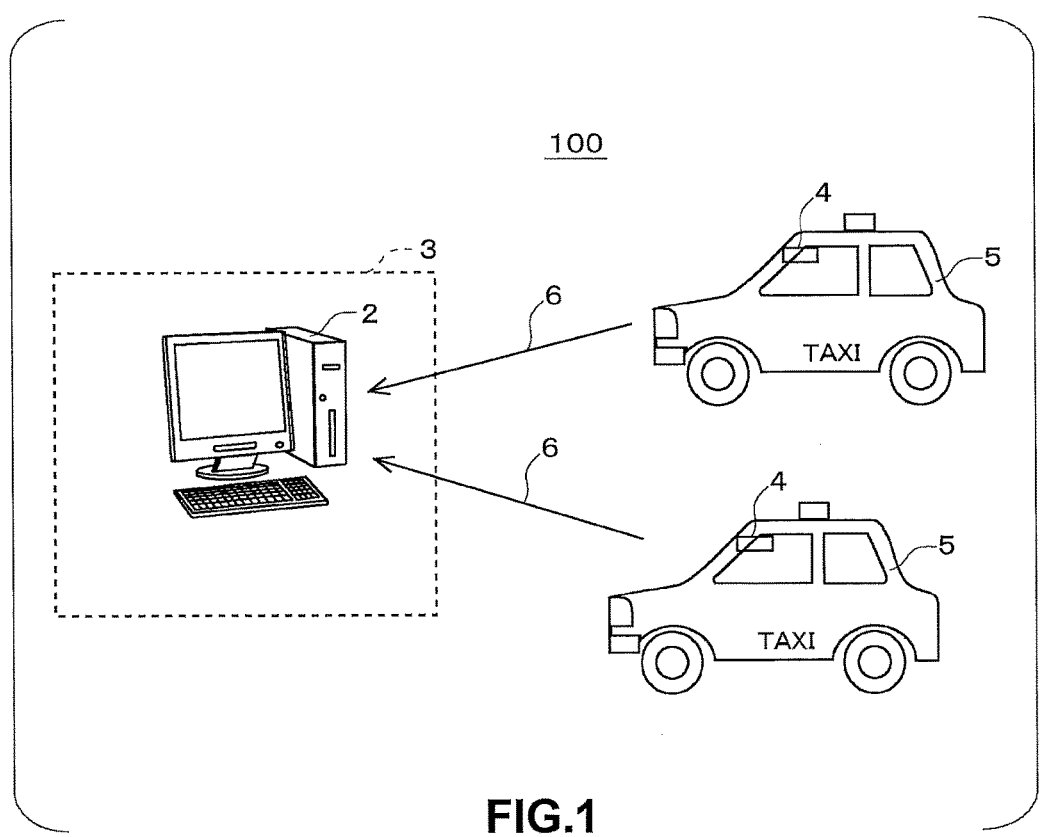
FIG. 1 illustrates a schematic image of a recorder system.

FIG. 1 illustrates a schematic image of a recorder system 100 for processing moving image data captured while a vehicle is traveling. The recorder system 100 includes a data reproducing apparatus 2 and a drive recorder 4. The recorder system 100 is used by a business operator that runs a business using a plurality of the vehicles for business, such as trucks, busses and taxis. A case where the recorder system 100 is used by a business operator that runs a taxi business is explained, as an example, in the description below.

This business operator uses a plurality of vehicles 5 that are used as taxis for the business. Each of the plurality of vehicles 5 includes the drive recorder 4 installed to capture the moving image data showing a vicinity of the vehicle 5 while the vehicle is traveling. The data reproducing apparatus 2 that reproduces the moving image data captured by the drive recorder 4 is installed in an office 3 of the business operator that controls the plurality of vehicles 5.

The drive recorder 4 in each of the plurality of vehicles 5 includes a camera that acquires still images by capturing images of an area in front of the vehicle 5. The camera of the drive recorder 4 in each of the plurality of vehicles 5 is installed on, for example, an upper portion of a front windshield of the vehicle 5, having an optical axis being directed forward.

Moreover, the drive recorder 4 includes a volatile image memory that stores still images. The drive recorder 4 acquires and stores, in a predetermined time cycle (e.g., 1/30 second cycle), the still images showing the area in front of the vehicle 5. Thus, the drive recorder 4 always stores a plurality of the still images captured during a latest predetermine time period.

The drive recorder 4 has an event recording function of capturing the moving image data of a predetermined event (an accident or an event possibly resulting in an accident) in a case where the predetermined event occurs while the vehicle 5 is traveling. In the case where the predetermined event occurs, the drive recorder 4 captures, on a memory card that is a portable recording medium, the moving image data based on the plurality of the still images acquired before and after the event (hereinafter referred to as "event moving image data").

The drive recorder 4 is configured to acquire a speed and an acceleration of each of the plurality of vehicles 5. The predetermined event occurs with sudden braking of the vehicle 5 or collision with an object. Therefore, in a case where the speed or the acceleration of the vehicle 5 satisfies a predetermined condition, the drive recorder 4 determines that the predetermined event occurred. The drive recorder 4 records on the memory card the moving image data including the plurality of the still images captured, for example, for 12 seconds before and 8 seconds after the event, i.e. for 20 seconds in total.

Moreover, even without such an event, the drive recorder 4 also has a continuous recording function of continuously capturing the moving image data on the memory card from starting of drive to end of the drive. The drive recorder 4 captures the moving image data including the plurality of the still images of a predetermined time period (e.g., 10 minutes) for the predetermined time period (hereinafter referred to as "continuous moving image data").

Therefore, the drive recorder 4 captures both of the event moving image data related to occurrence of the predetermined event and the continuous moving image data unrelated to the occurrence of the predetermined event. In this specification, a time period in which the plurality of the still images included in the moving image data are captured is referred to as "image-capturing time period" of the moving image data. Images showing the area in front of the vehicle 5 of the image-capturing time period are reproduced during an image-reproducing time period. In a case where the moving image data is the event moving image data, the image-capturing time period is 20 seconds before and after the event. Moreover, each of the plurality of the still images included in the moving image data serves as a "frame" of the moving image data.

The drive recorder 4 associates the moving image data with a vehicle identification code for identifying each of the plurality of vehicles 5 and with behavioral data that shows behavior of each vehicle 5 during the image-capturing time period in which the moving image data was captured, etc., as related information, and stores the associated data on the memory card. The behavioral data includes time-series data of the speed and the acceleration of the vehicle 5 during the image-capturing time period in which the moving image data was captured.

The data reproducing apparatus 2 is configured to retrieve moving image data 6 captured by the drive recorder 4 of each of the plurality of vehicles 5, via the memory card. The data reproducing apparatus 2 may retrieve the moving image data 6 from the drive recorder 4 via wireless or wired data communications.

The data reproducing apparatus 2 reproduces the retrieved moving image data 6. The data reproducing apparatus 2 displays a mark showing a stoppable distance that the vehicle 5 requires to come to a stop and a mark showing an actual inter-vehicle distance, in addition to contents of the moving image data 6, during the image-reproducing time period in which the moving image data was captured. The data reproducing apparatus 2 is described in detail below.

<1-2. Configuration of Data Reproducing Apparatus>

Figure 2:
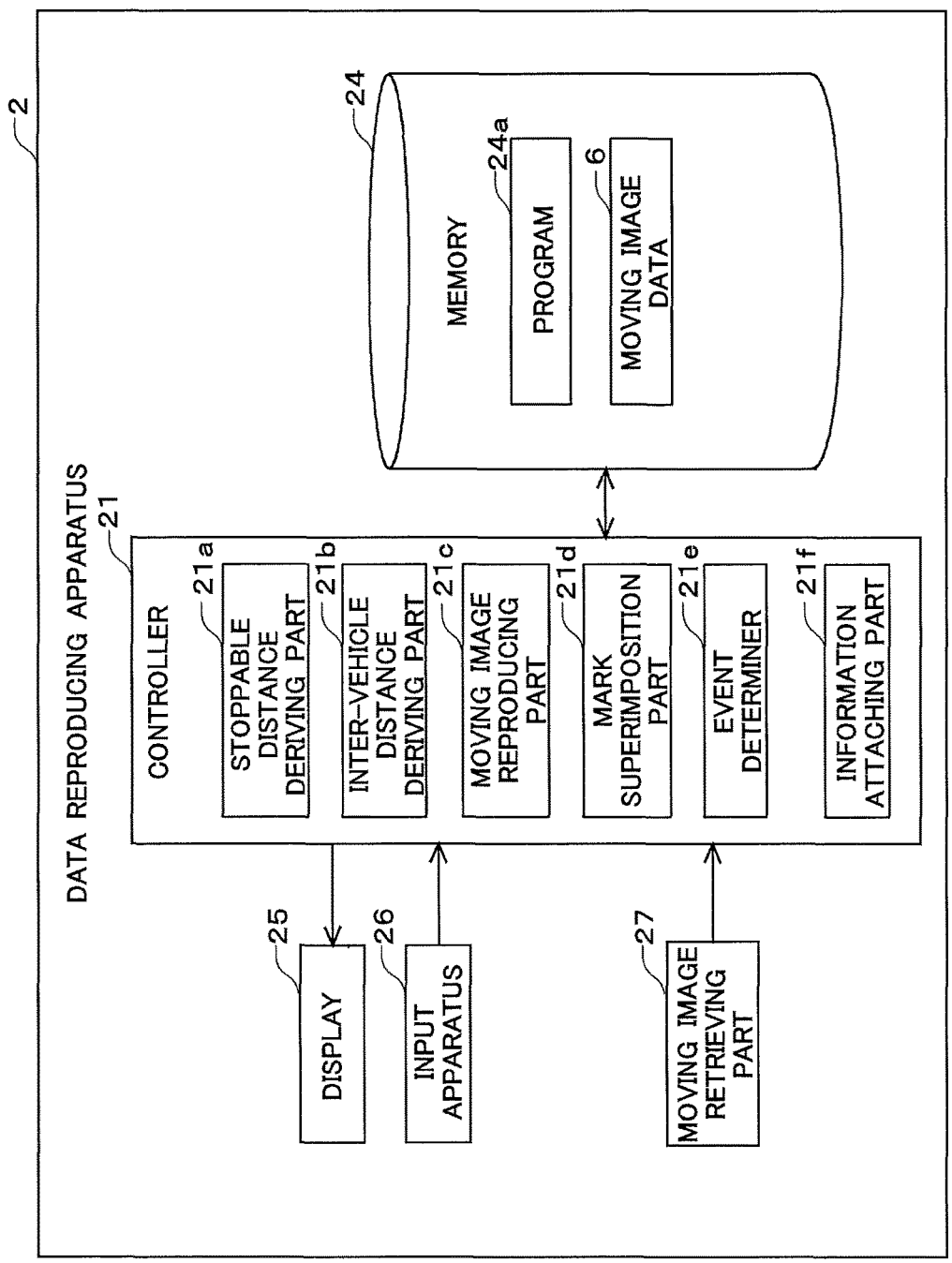
FIG. 2 illustrates a configuration of a data reproducing apparatus.

FIG. 2 illustrates a configuration of the data reproducing apparatus 2. The data reproducing apparatus 2 includes a controller 21, a display 25, an input apparatus 26, a moving image retrieving part 27 and a memory 24.

The controller 21 is a computer including, for example, a CPU, a RAM and a ROM, etc. The display 25 is, for example, a liquid crystal display, for displaying various types of information. The input apparatus 26 receives operations of a user, and is, for example, a keyboard, a mouse and a touch panel.

The moving image retrieving part 27 retrieves the moving image data 6 captured by the drive recorder 4, and is, for example, a card reader that retrieves a captured content in the memory card. The moving image retrieving part 27 retrieves the moving image data 6 from the memory card and inputs the moving image data 6 into the controller 21. In a case where the moving image retrieving part 27 retrieves the moving image data 6 via data communication, the moving image retrieving part 27 is, for example, a communication apparatus for data communication.

The memory 24 is, for example, a hard disk that is a non-volatile storage apparatus for storing various types of data. The moving image data 6 retrieved by the moving image retrieving part 27 is stored in the memory 24. The moving image retrieving part 27 retrieves the moving image data 6 captured by the drive recorder 4 of each of the plurality of vehicles 5. Therefore, a large amount of the moving image data is stored in the memory 24. As described above, the event moving image data and the continuous moving image data are included in the moving image data 6, and are stored in different folders in the memory 24 to be distinguished from each other. Moreover, the moving image data 6 stored in the memory 24 is associated with the vehicle identification codes and the behavioral data, etc.

Moreover, a program 24a is stored in the memory 24. The program 24a is acquired by, for example, being retrieved from a storage medium (a non-transitory computer-readable reading medium), such as a memory card, from which a computer can retrieve the program 24a.

Necessary functions to work as the data reproducing apparatus 2 are implemented by execution of the program 24a (i.e., performing an arithmetic calculation based on the program 24a) by the CPU of the controller 21. A stoppable distance deriving part 21a, an inter-vehicle distance deriving part 21b, a moving image reproducing part 21c, a mark superimposition part 21d, an event determiner 21e and an information attaching part 21f, shown in FIG. 2, are among the functions of the data reproducing apparatus 2 implemented by execution of the program 24a.

The stoppable distance deriving part 21a derives the stoppable distance that the vehicle requires to come to a stop during the image-capturing time period in which the moving image data 6 was captured. The stoppable distance deriving part 21a derives the stoppable distance based on the speed of the vehicle included in the behavioral data associated with the moving image data 6.

The inter-vehicle distance deriving part 21b derives the inter-vehicle distance that is a distance between the vehicle and a preceding vehicle located ahead of the vehicle during the image-capturing time period in which the moving image data 6 was captured. The inter-vehicle distance deriving part 21b derives the inter-vehicle distance based on an image of the preceding vehicle included in the moving image data 6.

The moving image reproducing part 21c reproduces the moving image data 6 captured by the drive recorder 4. When reproducing the moving image data 6, the moving image reproducing part 21c causes a plurality of the frames included in the moving image data 6 to be displayed temporally continuously on the display 25.

The mark superimposition part 21d informs the user of various types of information by superimposing the information on each frame displayed on the display 25 by the moving image reproducing part 21c. The mark superimposition part 21d superimposes the two marks for the stoppable distance and the inter-vehicle distance on each frame.

The event determiner 21e determines whether or not the predetermined event has occurred during the image-capturing time period in which the moving image data 6 was captured to be reproduced. The event determiner 21e determines whether or not the predetermined event has occurred based on a type of the moving image data 6 to be reproduced.

The information attaching part 21f attaches, to the moving image data 6, predetermined caution information showing that the inter-vehicle distance was inappropriate during the image-capturing time period.

Concrete processes of the stoppable distance deriving part 21a, the inter-vehicle distance deriving part 21b, the moving image reproducing part 21c, the mark superimposition part 21d, the event determiner 21e and the information attaching part 21f will be described later in detail.

<1-3. Process of Data Reproducing Apparatus>

Figure 3:
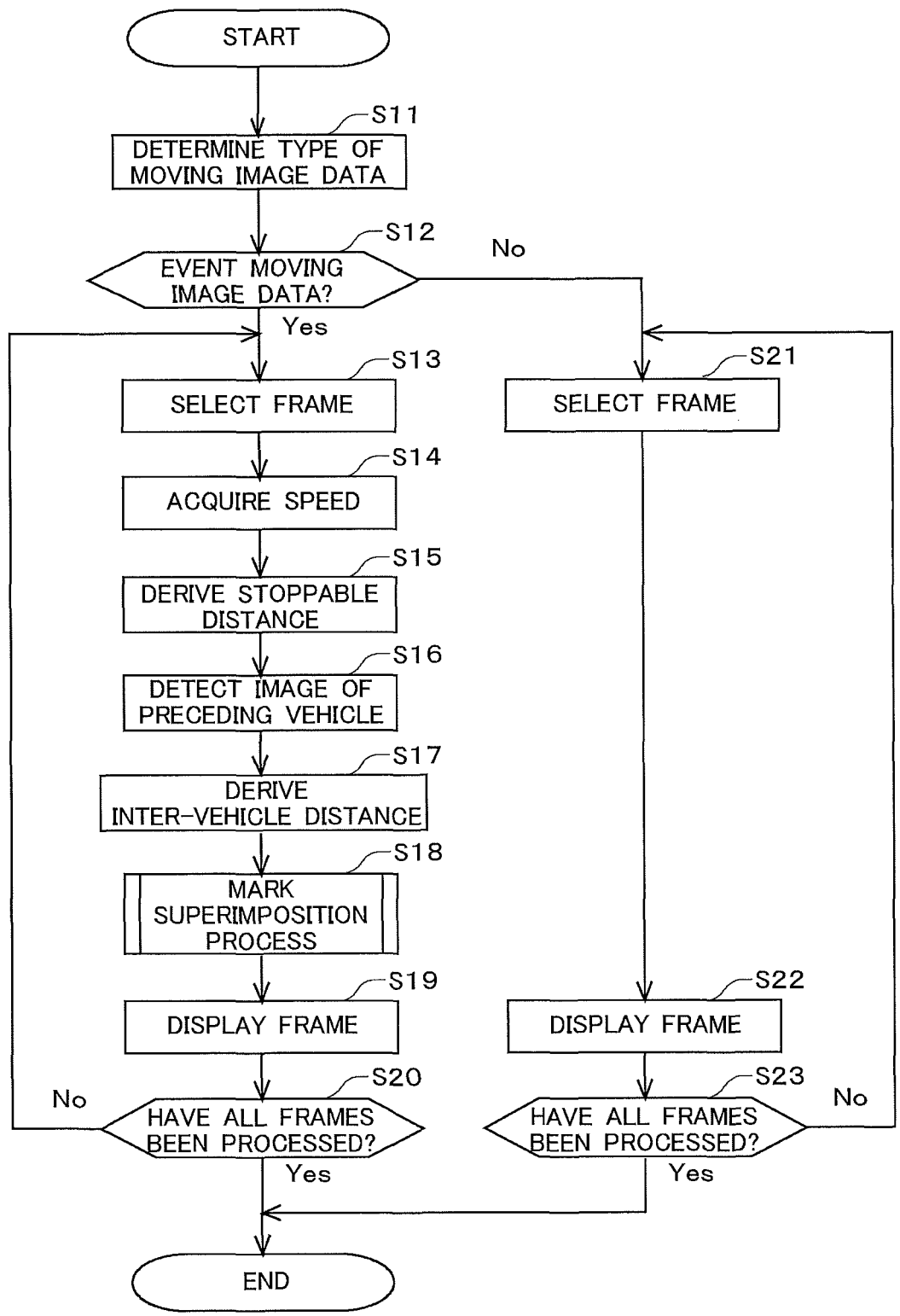
FIG. 3 illustrates a flow of a process of reproducing moving image data in a first embodiment.

FIG. 3 illustrates a flow of a process performed by the data reproducing apparatus 2 to reproduce the moving image data 6. At a starting point of the process shown in FIG. 3, the user already selected one group of the moving image data 6 to be reproduced, from amongst a plurality of groups of the moving image data 6 stored in the memory 24. In this description, the group of the moving image data to be reproduced is referred to as "reproduced moving image data group." Moreover, a vehicle on which the reproduced moving image data group is captured is referred to as "host vehicle." With reference to FIG. 3, the flow of the process of the data reproducing apparatus 2 is described below.

First, the event determiner 21e determines whether or not the predetermined event (an accident or an event possibly resulting in an accident) has occurred during the image-capturing time period in which the reproduced moving image data group was captured. Specifically, the event determiner 21e determines the type of the reproduced moving image data group (a step S11).

In a case where the reproduced moving image data group is the event moving image data (Yes in a step S12), the event determiner 21e determines that the predetermined event occurred during the image-capturing time period in which the reproduced moving image data group was captured. In this case, a frame on which the two marks for the stoppable distance and the inter-vehicle distance are superimposed is displayed on the display 25.

Specifically, first, the moving image reproducing part 21c sequentially selects one of the frames of the reproduced moving image data group (a step S13). The frame selected by the moving image reproducing part 21c is referred to as "current frame" below.

Next, the stoppable distance deriving part 21a acquires a speed of the host vehicle at a time at which the current frame was acquired during the image-capturing time period in which the reproduced moving image data group was captured (a step S14). The stoppable distance deriving part 21a acquires a speed V (km/h) of the host vehicle at the time at which the current frame was acquired, with reference to the behavioral data associated with the reproduced moving image data group.

Next, the stoppable distance deriving part 21a derives the stoppable distance at the time point at which the current frame was acquired during the image-capturing time period in which the reproduced moving image data group was captured, based on the acquired speed V of the host vehicle (a step S15). The stoppable distance is a distance that the host vehicle moves from a time point at which a driver of the host vehicle starts stopping the host vehicle to a time point at which the host vehicle actually stops. If the inter-vehicle distance is greater than the stoppable distance, the driver can stop the vehicle safely. Thus, the stoppable distance serves as a rough idea of "appropriate inter-vehicle distance."

The stoppable distance includes: an idle running distance that the vehicle travels from a time point at which a driver notices a danger until a time point at which the driver applies a brake; and a braking distance that the vehicle travels from a time point at which the driver applies a brake until a time point at which the vehicle stops. The stoppable distance varies depending on the speed V of a vehicle. A stoppable distance Da (m) is derived, for example, in a formula (1) below.

$$Da = 0.28V + (5.63 \times 10^{-3}) \times V^2 \tag{1}$$

A distance derived in the formula (1) is a theoretical distance in which a vehicle can stop. Therefore, in consideration of more safety, the stoppable distance Da used for the process may be a value derived by adding an extra distance for safety to a value derived by the formula (1) or may be a value derived by multiplying the value derived by the formula (1) by a coefficient of more than 1 for safety. Moreover, the stoppable distance Da may be changed based on weather and/or a time of day of the image-capturing time period in which the moving image data was captured. For example, generally, the braking distance tends to be longer in rainy days, and the idle running distance tends to be longer at night. Therefore, in rainy days and at night, it is recommended that the stoppable distance Da should be longer as compared to in other weather and/or at other time of day. Whether or not it is rainy during the image-capturing time period in which the moving image data was captured may be determined, for example, by an image of water drops in the moving image data, an image of a windshield wiper, etc.

Next, the inter-vehicle distance deriving part 21b detects the image of the preceding vehicle in the current frame of the reproduced moving image data group (a step S16).

Figure 4:
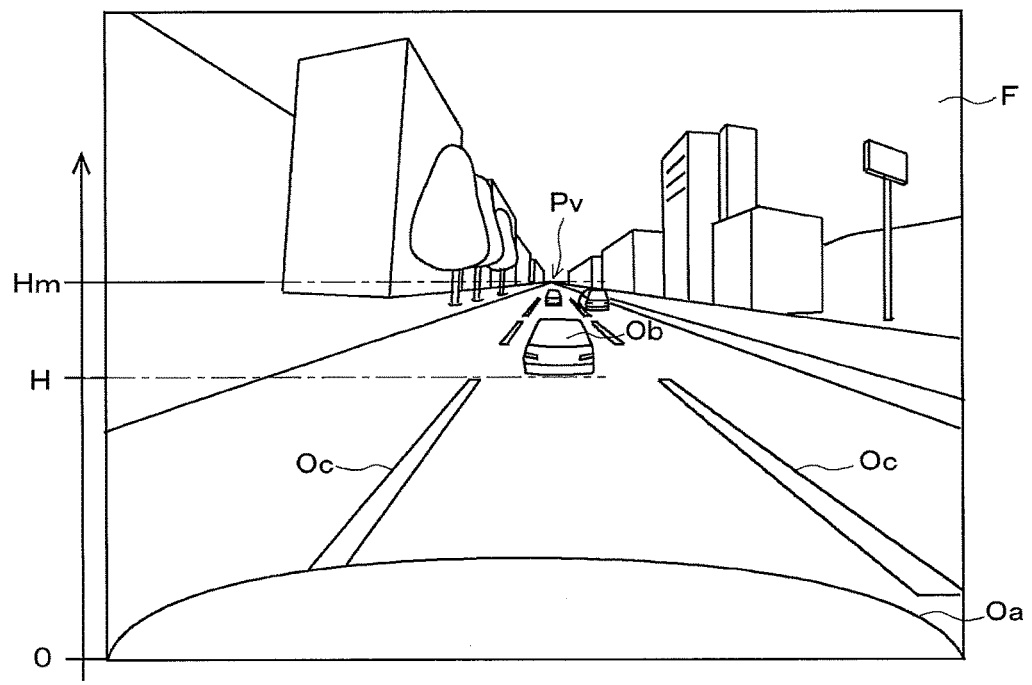
FIG. 4 illustrates an example of a frame in moving image data.

FIG. 4 illustrates an example of a frame F in the reproduced moving image data group. As shown in FIG. 4, there is a case where a preceding vehicle image Ob of the preceding vehicle traveling ahead of the host vehicle is included in the frame F. The inter-vehicle distance deriving part 21b detects the preceding vehicle image Ob, using a well-known method, such as a pattern matching.

In a case where the inter-vehicle distance deriving part 21b detects the preceding vehicle image Ob, the inter-vehicle distance deriving part 21b next derives the inter-vehicle distance between the preceding vehicle and the host vehicle (a step S17). The inter-vehicle distance deriving part 21b derives the inter-vehicle distance based on a position of the preceding vehicle image Ob in the current frame F.

As shown in FIG. 4, the preceding vehicle image Ob exists between a host vehicle image Oa in a center in a horizontal direction and a vanishing point Pv in the frame F. As the inter-vehicle is longer, the position of the preceding vehicle image Ob is located higher in a vertical direction in the frame F. Therefore, the inter-vehicle distance deriving part 21b derives the inter-vehicle distance based on a position H (hereinafter referred to as "preceding vehicle image position") of the preceding vehicle image Ob from a lower edge of the frame F in the vertical direction.

Figure 5:
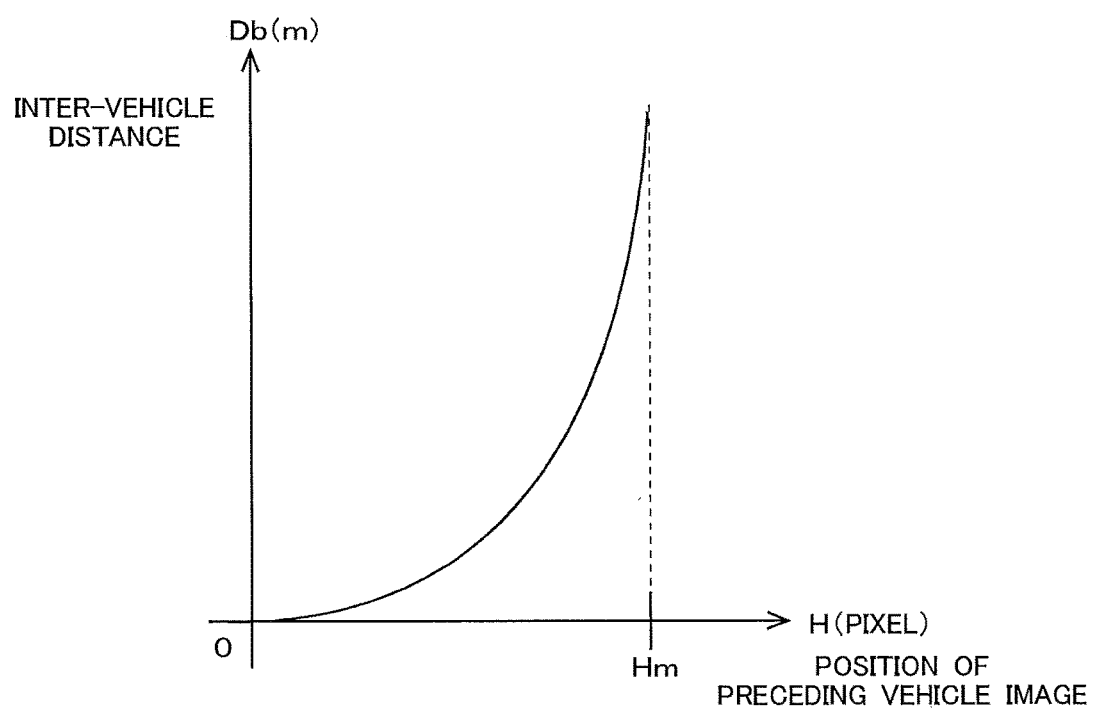
FIG. 5 illustrates a characteristic curve showing a relation between a preceding vehicle image position and an inter-vehicle distance.

FIG. 5 illustrates a characteristic curve showing a relation between the preceding vehicle image position H (pixel) and an inter-vehicle distance Db (m). As shown in FIG. 5, the characteristic curve slopes upward to a right in which the inter-vehicle distance Db can be infinite at a position Hm of the vanishing point Pv from the lower edge of the frame F in the vertical direction. The inter-vehicle distance deriving part 21b derives the inter-vehicle distance Db based on the preceding vehicle image position H, by using such a characteristic curve.

Plural types of the characteristic curve like an example shown in FIG. 5 are prepared based on types and sizes of vehicles in which the drive recorder 4 is installable. One of the plural types of the characteristic curve is selected beforehand to be used for the vehicle in which the drive recorder 4 is installed and the characteristic curve corresponding to the vehicle is stored in the memory 24. The inter-vehicle distance deriving part 21b recognizes the type of the host vehicle based on the vehicle identification code associated with the reproduced moving image data group and retrieves, from the memory 24, the characteristic curve corresponding to the type of the vehicle, and then uses the retrieved characteristic curve to derive the inter-vehicle distance Db. The characteristic curve may be used after being adjusted based on a height, the optical axis, etc. of the camera of the drive recorder 4 actually installed in the vehicle.

Once the inter-vehicle distance deriving part 21b derives the inter-vehicle distance Db, the mark superimposition part 21d performs a mark superimposition process in which the two marks for the derived stoppable distance Da and the inter-vehicle distance Db are superimposed on the current frame F (a step S18 in FIG. 3). Then, the moving image reproducing part 21c causes the current frame to be displayed on the display 25 (a step S19). Thus, the user who watches the moving image data can recognize the current frame on which the two marks are superimposed.

Figure 6:
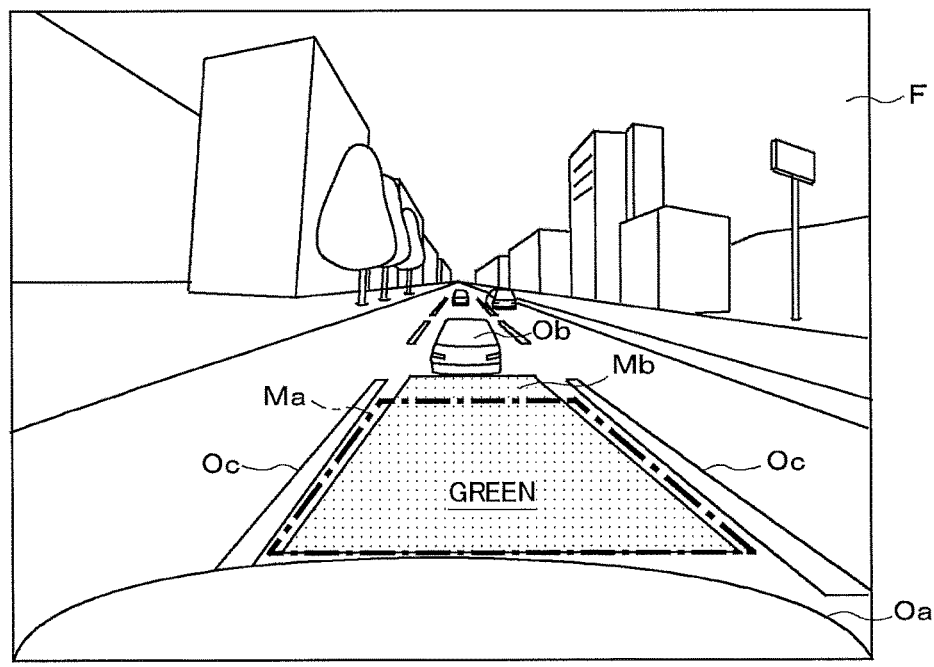
FIG. 6 illustrates an example of a frame including two marks.
Figure 7:
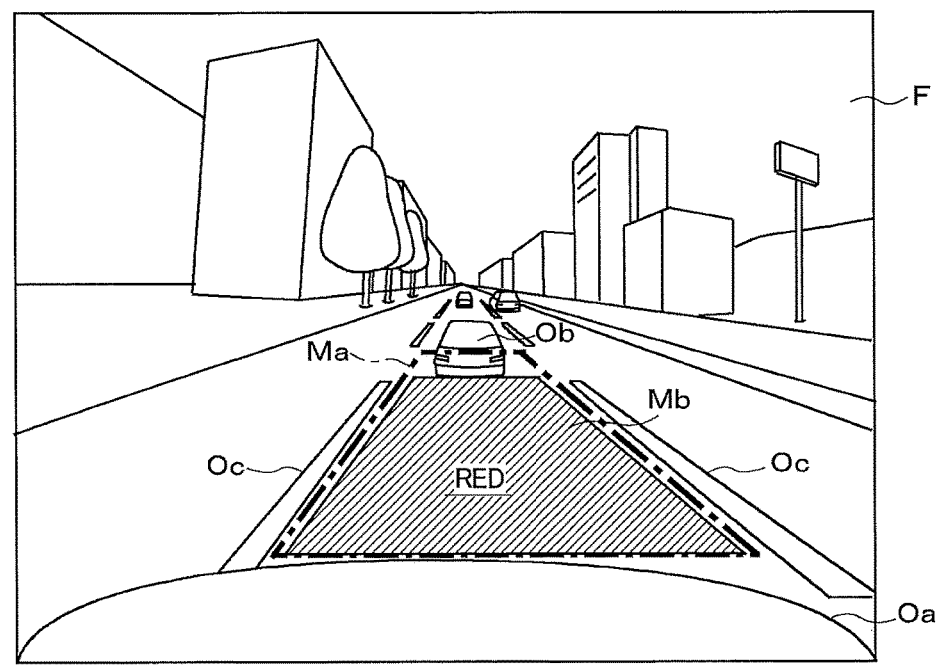
FIG. 7 illustrates an example of a frame including the two marks.

Each of FIGS. 6 and 7 illustrates an example of the frame F on which two marks Ma and Mb are superimposed. As shown in those figures, the first mark Ma and the second mark Mb are superimposed on an object image of an object included in the frame F. The first mark Ma shows a position corresponding to the stoppable distance Da on the object image in the frame F. The second mark Mb shows a position corresponding to the inter-vehicle distance Db from the host vehicle on the object image in the frame F. As shown in those figures, the first mark Ma and the second mark Mb are substantially trapezoidal.

The mark superimposition part 21d sets lower ends (lower base) of trapezoids of the two marks Ma and Mb to a position of the host vehicle image Oa. Moreover, the mark superimposition part 21d sets upper ends (higher base) of the trapezoids of the two marks Ma and Mb to positions to be shown by the two marks Ma and Mb. In other words, the mark superimposition part 21d sets the upper end of the first mark Ma to the position corresponding to the stoppable distance Da on the object image and the upper end of the second mark Mb to the position corresponding to the inter-vehicle distance Db on the object image from the host vehicle image. The mark superimposition part 21d derives those positions corresponding to the stoppable distance Da and the inter-vehicle distance Db on the object image, using the characteristic curve as shown in FIG. 5.

FIG. 6 illustrates an example of the frame F in a case where the inter-vehicle distance Db is greater than the stoppable distance Da. In the frame F in FIG. 6, the upper end of the second mark Mb showing the inter-vehicle distance Db is located higher than the upper end of the first mark Ma showing the stoppable distance Da. Therefore, when seeing the frame F, the user can intuitively recognize the inter-vehicle distance Db is greater than the stoppable distance Da, i.e., the inter-vehicle distance Db was appropriate.

On the other hand, FIG. 7 illustrates an example of the frame F in a case where the inter-vehicle distance Db is smaller than the stoppable distance Da. In the frame F in FIG. 7, the upper end of the second mark Mb showing the inter-vehicle distance Db is located lower than the upper end of the first mark Ma showing the stoppable distance Da. Therefore, when seeing the frame F, the user can intuitively recognize the inter-vehicle distance Db is smaller than the stoppable distance Da, i.e., the inter-vehicle distance Db was inappropriate.

Subsequently, each of the plurality of the frames F included in the reproduced moving image data group is processed as with the frame F described above until all the frames F in the reproduced moving image data group are processed (a step S20 in FIG. 3). Thus, the stoppable distance Da and the inter-vehicle distance Db are derived for each frame F and the two marks Ma and Mb showing the stoppable distance Da and the inter-vehicle distance Db are displayed on the display 25.

Accordingly, the user can intuitively understand, during the image-reproducing time period in which the event moving image data is reproduced, a relation between the inter-vehicle distance Db and the stoppable distance Da changing every second during the image-capturing time period in which the event moving image data was captured. In other words, the user can intuitively understand whether or not the inter-vehicle distance Db has been appropriate during the image-capturing time period in which the event moving image data was captured.

Moreover, in a case where the reproduced moving image data group is the continuous moving image data in the step S11 (No in the step S12), the frame F on which the two marks Ma and Mb for the stoppable distance Da and the inter-vehicle distance Db are not superimposed is displayed on the display 25.

Figure 8:
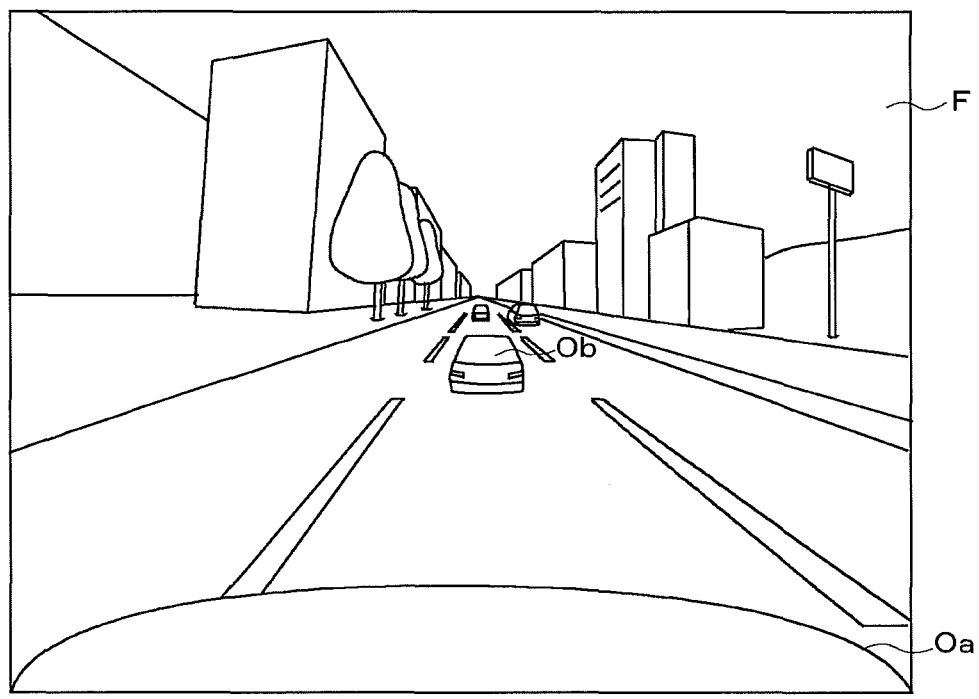
FIG. 8 illustrates an example of a frame not including the two marks.

In other words, the moving image reproducing part 21c sequentially selects one of the plurality of the frames F in the reproduced moving image data group (a step S21) and causes the selected frame F to be displayed on the display 25 without any process (a step S22). Thus, as shown in FIG. 8, the frame F not including the two marks Ma and Mb is displayed on the display 25. Then, this process is repeated until all the frames F in the reproduced moving image data group are processed (a step S23).

Accordingly, the user can understand contents of the continuous moving image data without influence of the two marks Ma and Mb during the image-reproducing time period in which the continuous moving image data is reproduced. Since the continuous moving image data is captured irrelevantly to occurrence of an event, the user usually checks the contents of the continuous moving image data from a viewpoint different from the inter-vehicle distance. Therefore, in a case where the reproduced moving image data group is the continuous moving image data, the user can check the contents of the continuous moving image data sufficiently by displaying the frame F not including the two marks Ma and Mb.

Even in the case where the reproduced moving image data group is the continuous moving image data, the two marks Ma and Mb may be displayed by setting an option. On the other hand, even in the case where the reproduced moving image data group is the event moving image data, the two marks Ma and Mb may not be displayed by setting an option.

<1-4. Mark Superimposition Process>

Figure 9:
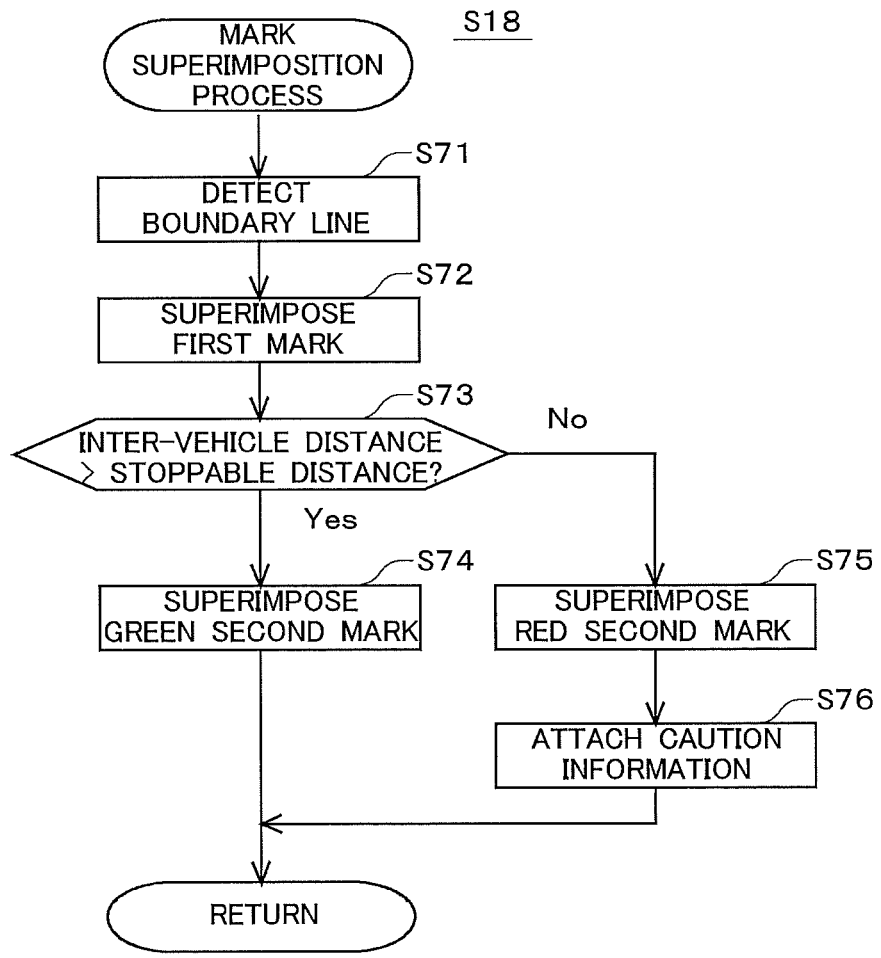
FIG. 9 illustrates a detailed flow of a mark superimposition process.

Next described more in detail is the mark superimposition process in which the mark superimposition part 21d superimposes the two marks of the stoppable distance Da and the inter-vehicle distance Db (the step S18 in FIG. 3). FIG. 9 illustrates a detailed flow of the mark superimposition process.

First, the mark superimposition part 21d detects an image of a boundary line included in the current frame F (a step S71). As shown in FIG. 4, the frame F includes a boundary line image Oc of the boundary line that defines a traffic lane in which the host vehicle is traveling. The mark superimposition part 21d detects such a boundary line image Oc in the current frame F. The mark superimposition part 21d detects the boundary line image Oc, using a well-known white line recognition technology. The mark superimposition part 21d detects the boundary line image Oc, for example, based on binarized results of pixel values of the current frame F. The mark superimposition part 21d detects the boundary line images Oc on a right side and a left side of the traffic lane in which the host vehicle is traveling.

Next, the mark superimposition part 21d generates the first mark Ma showing the stoppable distance Da and superimposes the first mark Ma on the object image in the current frame F (a step S72). The mark superimposition part 21d generates the first mark Ma by setting four sides (higher base, lower base and two legs) of the trapezoid that serves as the first mark Ma.

The mark superimposition part 21d sets the two legs of the trapezoid based on the boundary line images Oc detected in the step S71. The mark superimposition part 21d sets a left leg of the two legs of the trapezoid substantially parallel to the boundary line image Oc on the left side of the traffic lane and sets a right leg of the two legs of the trapezoid substantially parallel to the boundary line image Oc on the right side of the traffic lane. Moreover, as described above, the mark superimposition part 21d places the higher base of the trapezoid to the position corresponding to the stoppable distance Da and the lower base of the trapezoid to the position of the host vehicle image Oa.

Then, the mark superimposition part 21d adjusts a horizontal position of the first mark Ma such that the first mark Ma is placed between the boundary line images Oc on the left and right sides, and superimposes the first mark Ma on the object image in the frame F. Thus, as shown in FIG. 6 and FIG. 7, the trapezoidal first mark Ma is superimposed along the traffic lane in which the host vehicle is traveling. Since the trapezoidal first mark Ma is superimposed along the traffic lane as described above, the user can intuitively understand the stoppable distance Da.

The mark superimposition part 21d compares the inter-vehicle distance Db with the stoppable distance Da (a step S73).

In a case where the inter-vehicle distance Db is greater than the stoppable distance Da (Yes in the step S73), the mark superimposition part 21d generates the second mark Mb in green and superimposes the green second mark Mb on the object image in the current frame F (a step S74). The mark superimposition part 21d sets four sides (higher base, lower base and two legs) of the trapezoid that serves as the second mark Mb and generates the second mark Mb such that an inside area enclosed by the four sides is green.

The mark superimposition part 21d sets the two legs of the trapezoid based on the boundary line image Oc detected in the step S71 similarly to a case of the first mark Ma. Moreover, as described above, the mark superimposition part 21d places the higher base of the trapezoid to the position corresponding to the inter-vehicle distance Db and the lower base of the trapezoid to the position of the host vehicle image Oa.

Then, the mark superimposition part 21d adjusts a horizontal position of the second mark Mb such that the second mark Mb is placed between the boundary line images Oc on the left and right sides, and superimposes the green second mark Mb on the object image in the frame F. Thus, as shown in FIG. 6, the green second mark Mb is superimposed along the traffic lane in which the host vehicle is traveling.

On the other hand, in a case where the inter-vehicle distance Db is smaller than the stoppable distance Da (No in the step S73), the mark superimposition part 21d generates the second mark Mb in red and superimposes the red second mark Mb on the object image in the current frame F (a step S75). Similar to the step S74, the mark superimposition part 21d generates the second mark Mb such that the inside area enclosed by the four sides is red. Thus, as shown in FIG. 7, the red second mark Mb is superimposed along the traffic lane in which the host vehicle is traveling.

As described above, the mark superimposition part 21d changes a color of the second mark Mb, depending on whether the inter-vehicle distance Db is greater or smaller than the stoppable distance Da. Therefore, the user can understand the relation between the inter-vehicle distance Db and the stoppable distance Da based on the color of the second mark Mb and thus can intuitively understand whether or not the inter-vehicle distance Db has been appropriate in the image-capturing time period of the moving image data. In a case where the inter-vehicle distance Db is equal to the stoppable distance Da, the color of the second mark Mb may be set in any of green and red.

Moreover, in the case where the inter-vehicle distance Db is smaller than the stoppable distance Da, the information attaching part 21f attaches, to the moving image data, the caution information showing that the inter-vehicle distance was inappropriate during the image-capturing time period (a step S76). The information attaching part 21f associates the caution information with the reproduced moving image data group and stores the associated caution information in the memory 24.

As described above, the caution information is attached to the moving image data including the inappropriate inter-vehicle distance during the image-capturing time period. Therefore, by extracting later the moving image data attached with the caution information, the user can easily identify only the moving image data including the inappropriate inter-vehicle distance from amongst the plurality of groups of the moving image data 6 stored in the memory 24. Those moving image data including the inappropriate inter-vehicle distance can be used for safety guidance and the like for the driver of the vehicle.

As described above, the stoppable distance deriving part 21a of the data reproducing apparatus 2 of this embodiment derives the stoppable distance Da that the vehicle requires to come to a stop, based on the speed of the vehicle during the image-capturing time period in which the moving image data. Moreover, the inter-vehicle distance deriving part 21b derives the inter-vehicle distance Db between the preceding vehicle and the vehicle during the image-capturing time period in which the moving image data was captured, based on the image of the preceding vehicle included in the moving image data. Then, the mark superimposition part 21d superimposes, on the object image in the moving image data during the image-reproducing time period thereof, the two marks Ma and Mb showing the position corresponding to the stoppable distance Da on the object image and the position corresponding to the inter-vehicle distance Db, respectively. Therefore, the user can intuitively understand whether or not the inter-vehicle distance has been appropriate during the image-capturing time period in which the moving image data was captured.

Moreover, the mark superimposition part 21d changes the color of the second mark Mb showing the position corresponding to the inter-vehicle distance Db, depending on whether the inter-vehicle distance Db is greater or smaller than the stoppable distance Da. Therefore, the user can more intuitively understand whether or not the inter-vehicle distance Db has been appropriate during the image-capturing time period in which the moving image data was captured.

<2. Second Embodiment>

Next, a second embodiment is described. A configuration and an operation of a data reproducing apparatus 2 in the second embodiment are substantially the same as the configuration and the operation of the data reproducing apparatus 2 in the first embodiment. Therefore, differences from the first embodiment will be mainly described below.

In the first embodiment, the drive recorder 4 acquires both of the event moving image data and the continuous moving image data, and the data reproducing apparatus 2 reproduces both the event moving image data and the continuous moving image data. However, in the second embodiment, a drive recorder 4 acquires only continuous moving image data, and the data reproducing apparatus 2 reproduces only the continuous moving image data. Then, an event determiner 21e determines whether or not the continuous moving image data to be reproduced includes a predetermined event that has occurred during an image-capturing time period in which the reproduced continuous moving image data was captured.

Figure 10:
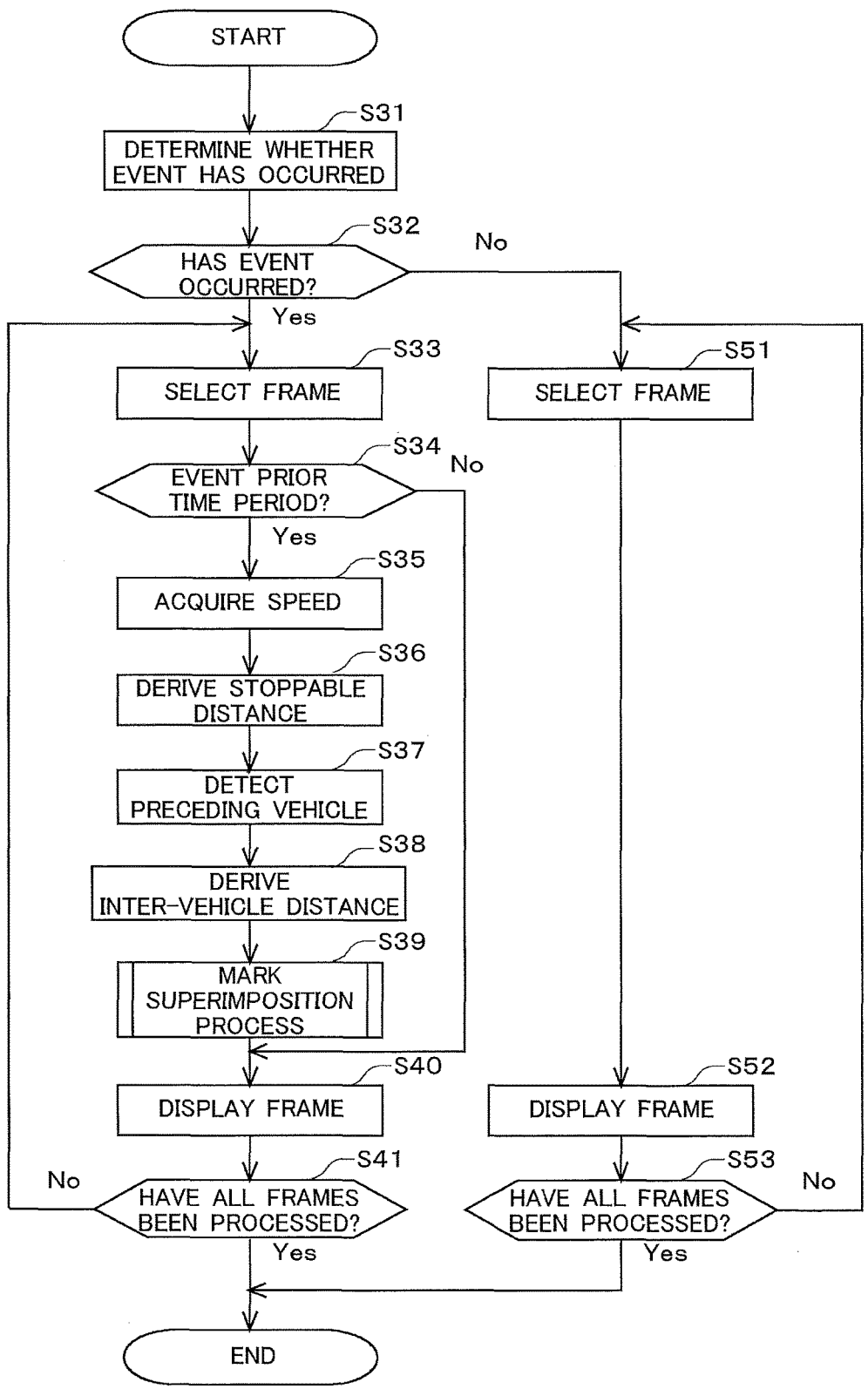
FIG. 10 illustrates a flow of a process of reproducing moving image data in the second embodiment.

FIG. 10 illustrates a flow of a process performed by the data reproducing apparatus 2 in the second embodiment to reproduce the continuous moving image data. At a starting point of the process shown in FIG. 10, one continuous moving image data group to be reproduced is already selected by a user from amongst a plurality of the continuous moving image data groups. In this description, the continuous moving image data to be reproduced is referred to as "reproduced moving image data group."

First, the event determiner 21e determines whether or not the predetermined event has occurred during the image-capturing time period in which the reproduced moving image data group was captured. Specifically, the event determiner 21e determines whether or not the predetermined event has occurred, based on behavioral data associated with the reproduced moving image data group (a step S31).

In a case where a speed or an acceleration of a vehicle 5 included in the behavioral data satisfies a predetermined condition, the event determiner 21e determines that the predetermined event occurred during the image-capturing time period in which the reproduced moving image data group is captured. The event determiner 21e identifies a time point at which the speed or the acceleration of the vehicle 5 satisfies the predetermined condition during the image-capturing time period in which the reproduced moving image data group was captured, as a time point at which the event occurred.

In a case where the predetermined event has not occurred (No in a step S32), a frame F on which a first mark Ma and a second mark Mb are not superimposed is displayed on a display 25 (steps S51 to S53), as with the first embodiment.

On the other hand, in a case where the predetermined event has occurred (Yes in the step S33), the frame F on which the first mark Ma and the second mark Mb are superimposed is displayed on the display 25 during a part of an image-reproducing time period in which the reproduced moving image data set. In other words, in a predetermined time period (e.g. 12 seconds) before the time point at which the event occurred (hereinafter referred to as "event prior time period") during the image-reproducing time period in which the reproduced moving image data group is reproduced, the frame F on which the two marks Ma and Mb are superimposed is displayed, and the frame F on which the two marks Ma and Mb are not superimposed is displayed in another part of the image-reproducing time period.

Specifically, first, the moving image reproducing part 21c sequentially selects one of a plurality of the frames F in the reproduced moving image data group (a step S33). In the description below, the frame F selected by the moving image reproducing part 21c is referred to as "current frame."

Next, a mark superimposition part 21d determines whether or not a time point at which the current frame was acquired during the image-capturing time period in which the reproduced moving image data group was captured is included in a time period corresponding to the event prior time period (a step S34).

In a case where the time point at which the current frame was acquired is not included in the time period corresponding to the event prior time period (No in the step S34), the process moves to a step S40 and the moving image reproducing part 21c causes the current frame F to be displayed on the display 25 without processing (a step S40). Thus, as shown in FIG. 8, the frame F not including the two marks Ma and Mb is displayed on the display 25.

On the other hand, in a case where the time point at which the current frame was acquired is included in the time period corresponding to the event prior time period (Yes in the step S34), steps S35 to S39 are performed. A process of the steps S35 to S39 is the same as the process of the steps S14 to S18 shown in FIG. 3. Thus, as shown in FIGS. 6 and 7, the frame F including the two marks Ma and Mb is displayed on the display 25.

Then, this process is repeated until all of the plurality of the frames F in the reproduced moving image data group are processed (a step S41). After the process described above, the frame F on which the two marks Ma and Mb are superimposed is displayed on the display 25 only in the event prior time period of the image-reproducing time period of the reproduced moving image data group.

Figure 11:
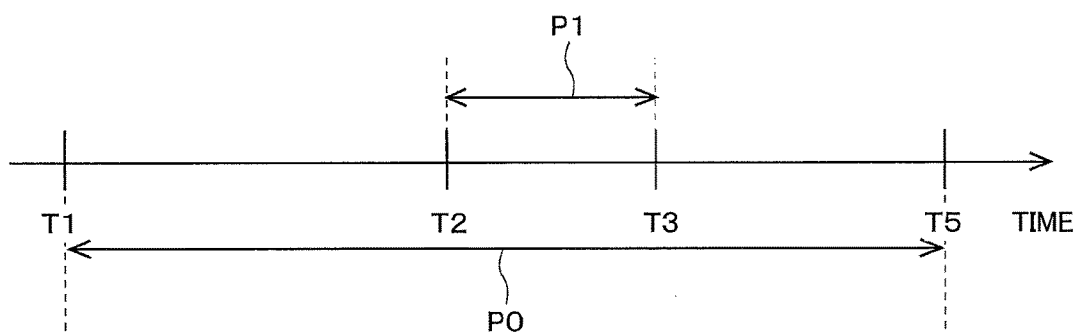
FIG. 11 illustrates an entire image-reproducing time period in which moving image data was captured.

FIG. 11 illustrates an entire image-reproducing time period P0 of the reproduced moving image data group. A time point T1 in FIG. 11 is a starting point of the image-reproducing time period P0 of the reproduced moving image data set, and a time point T5 is an end point of the image-reproducing time period P0 of the reproduced moving image data set. During such an image-reproducing time period P0, a time point T3 corresponds to the time point at which the event occurred (hereinafter referred to as "time point of the event occurrence"). Moreover, a time point T2 is a time point of a predetermined time period (e.g., 12 seconds) before the time point at which the event occurred. The mark superimposition part 21d superimposes the two marks Ma and Mb on the frame F only during an event prior time period P1 from the time point T2 to the time point T3.

Figure 12:
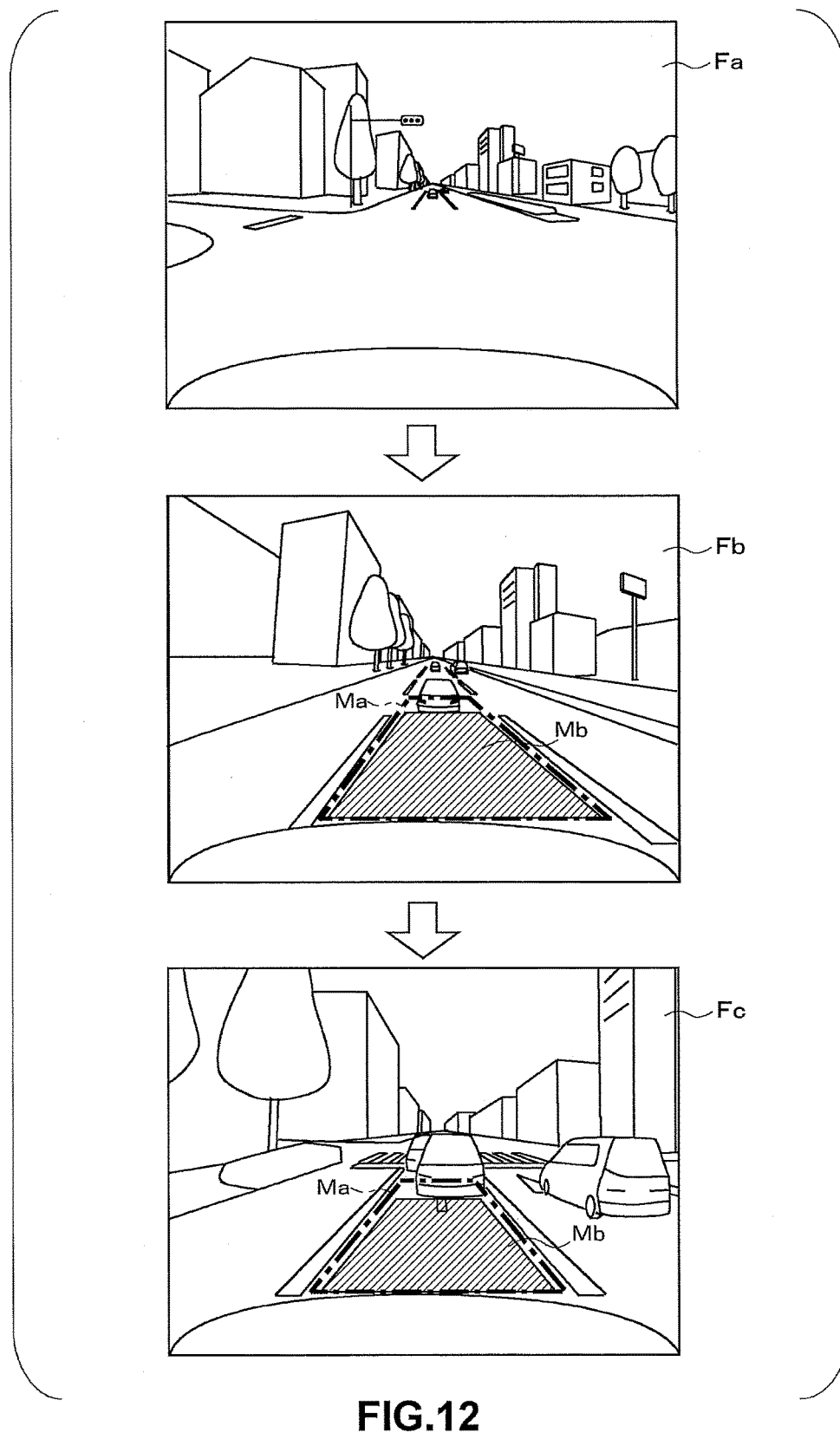
FIG. 12 illustrates examples of a frame shown during image-reproducing time period in which moving image data is reproduced.

FIG. 12 illustrates examples of the frame F shown during the image-reproducing time period in which the reproduced moving image data group. FIG. 12 illustrates three typical frames Fa to Fc of the plurality of the frames F in the reproduced moving image data group. The frame Fa in an upper portion of FIG. 12 is an oldest frame and the frame Fc in a bottom portion of FIG. 12 is a latest frame of the three frames Fa to Fc.

The frame Fc in the bottom portion of FIG. 12 was acquired at the time point of the event (e.g., sudden braking) occurrence during the image-capturing time period in which the reproduced moving image data group was captured. Moreover, the frame Fb in a center portion of FIG. 12 was acquired a predetermine time period (e.g., 12 seconds) before the time point of the event occurrence. Therefore, the time points at which the frames Fb and Fc have been acquired are included in a time period corresponding to the event prior time period.

Thus, the two marks Ma and Mb are superimposed on the frames Fb and Fc in the reproduced moving image data group shown in FIG. 12. As described above, since the two marks Ma and Mb are superimposed in the event prior time period, the user can intuitively understand whether or not the inter-vehicle distance has been appropriate immediately before the event.

Figure 13:
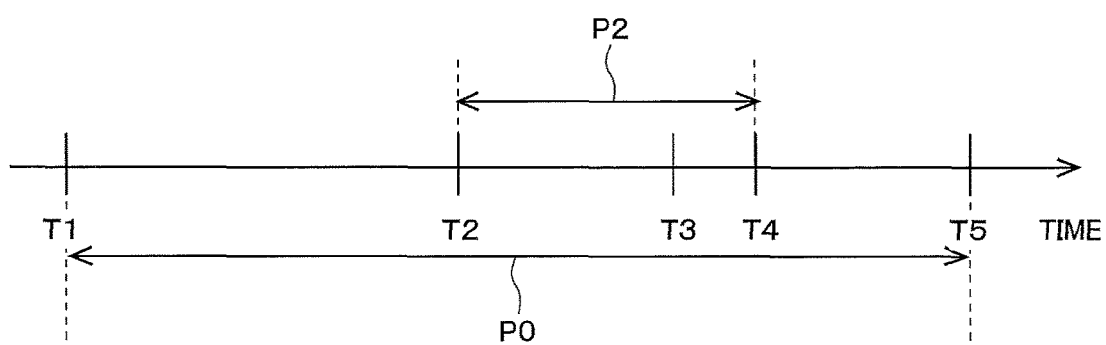
FIG. 13 illustrates an entire image-reproducing time period in which moving image data is reproduced.

During the image-reproducing time period in which the reproduced moving image data group is produced, in addition to the time period before the time point of the event occurrence, the mark superimposition part 21d may superimpose the two marks Ma and Mb in a time period after the time point of the event occurrence. For example, as shown in FIG. 13, the mark superimposition part 21d may superimpose the two marks Ma and Mb on the frame F during a predetermined time period (e.g., 20 seconds) P2 from the time point T2 to a time point T4 before and after the time point T3 at which the event occurred. The time period from the time point T2 to the time point T3 at which the event occurred is, for example, 12 seconds. Moreover, a time period from the time point T3 at which the event occurred to the time point T4 is, for example, 8 seconds. Thus, the user can intuitively understand whether or not the inter-vehicle distance has been appropriate immediately before and after the time point at which the event occurred.

<3. Modifications>

The embodiments of the invention are described above. However, the invention is not limited to the foregoing embodiments, but various modifications are possible. Such a modification is described below. Any form in the foregoing embodiments and the modifications described below may be arbitrarily combined with one another.

In the foregoing embodiments, the second mark Mb showing the inter-vehicle distance Db is superimposed in the process. However, in a case where the inter-vehicle distance Db is not derived due to, for example, absence of the preceding vehicle image Ob, the second mark Mb may not be superimposed in the process.

In the foregoing embodiments, the two marks Ma and Mb are superimposed on the frame only of the moving image data of the image-capturing time period in which the predetermined event occurred and the superimposed frame is displayed. However, regardless of occurrence of the predetermined event during the image-capturing time period, the two marks Ma and Mb may be superimposed on the frames for all of the moving image data and the superimposed frames may be displayed.

In the foregoing embodiments, the information attaching part 21f attaches the caution information to the reproduced moving image data group during the image-reproducing time period in which the moving image data is reproduced. However, a process may be performed in which an information attaching part 21f attaches the caution information, without reproducing the moving image data, to the reproduced moving image data group based on a result of comparison of the inter-vehicle distance Db and the stoppable distance Da.

In the foregoing embodiment, the mark superimposition part 21d detects the boundary line image as an image of a border line defining a traffic line. However, a mark superimposition part 21d may detect an image of curbstones, a shoulder of a road, guardrails, a center median, etc. as the image of the border line defining a traffic lane.

In the foregoing embodiments, the mark superimposition part 21d changes the color of the second mark Mb, depending on whether the inter-vehicle distance Db is greater or smaller than the stoppable distance Da. However, a mark superimposition part 21d may change a form, such as thickness or a shape, of the second mark Mb, depending on whether the inter-vehicle distance Db is greater or smaller than the stoppable distance Da. Moreover, a mark superimposition part 21d may change a form of the first mark Ma in addition to the form of the second mark Mb or the mark superimposition part 21d may change only the form of the first mark Ma.

In the foregoing embodiments, the two marks Ma and Mb are trapezoidal. However, if the position corresponding to the stoppable distance Da and the position corresponding to the inter-vehicle distance Db can be shown, a graphic form, such as a line, other than a trapezoid may be used. Moreover, one of the two marks Ma and Mb may be trapezoidal and the other may be in another graphic form.

In the foregoing embodiments, the inter-vehicle distance deriving part 21b derives the inter-vehicle distance Db based on the position of the preceding vehicle image in the moving image data. However, in a case where the moving image data is acquired with detection results detected by an object detector, such as a radar unit, mounted on the vehicle 5, an inter-vehicle distance deriving part 21*b* may derive the inter-vehicle distance Db based on the detection results.

In the foregoing embodiment, the function described as one block is not necessarily implemented by a single physical element, but may be implemented by separate physical elements. Further, in the foregoing embodiment, the function described as a plurality of blocks may be implemented by a single physical element. Further, a process relating to one arbitrary function may be shared and implemented by apparatuses inside and outside the vehicle, and the function may be implemented as a whole by exchanging information via communications between those apparatuses.

In the foregoing embodiments, the various functions are implemented by software by the CPU performing the arithmetic process in accordance with the program. However, a part of those functions may be implemented by an electric hardware circuit. Moreover, in the foregoing embodiments, a part of functions that are implemented by a hardware circuit may be implemented by software. Further, the function described as one block in the foregoing embodiment may be implemented by cooperation between software and hardware.

While the invention has been shown and described in detail, the foregoing description is in all aspects illustrative and not restrictive. It is therefore understood that numerous other modifications and variations can be devised without departing from the scope of the invention.

What is claimed is:

1. A data reproducing apparatus that reproduces moving image data that is captured while a vehicle is traveling, the data reproducing apparatus comprising:
    a controller configured to:
    derive a stoppable distance that the vehicle requires to come to a stop based on a speed of the vehicle obtained while the vehicle was traveling during an image-capturing time period in which the moving image data was captured;
    derive an inter-vehicle distance between the vehicle and a preceding vehicle located ahead of the vehicle during the image-capturing time period in which the moving image data was captured; and
    superimpose, on an object image generated from the moving image data, a first mark which shows a position corresponding to the stoppable distance and a second mark which shows a position corresponding to the inter-vehicle distance, wherein
    the controller changes a color of the second mark, depending on whether the inter-vehicle distance is greater or smaller than the stoppable distance.

2. The data reproducing apparatus according to claim 1, wherein
    the controller changes a form of at least one of the first and second marks depending on whether the inter-vehicle distance is greater or smaller than the stoppable distance.

3. The data reproducing apparatus according to claim 1, wherein:
    the controller is further configured to determine whether or not a predetermined event has occurred during the image-capturing time period in which the moving image data was captured, and
    in a case where the predetermined event has occurred during the image-capturing time period, the controller superimposes the first and second marks on the object image.

4. The data reproducing apparatus according to claim 3, wherein
    the controller superimposes the first and second marks on the object image in at least a predetermined time period before a time point at which the predetermined event occurred.

5. The data reproducing apparatus according to claim 1, wherein
    the first and second marks are substantially trapezoids.

6. The data reproducing apparatus according to claim 5, wherein
    the controller sets legs of the trapezoids substantially parallel to directions of boundary line images defining a traffic lane in which the vehicle is traveling in the moving image data.

7. The data reproducing apparatus according to claim 1, wherein:
    the controller further configured to attach predetermined information to the moving image data indicating that the inter-vehicle distance is smaller than the stoppable distance during the image-capturing time period.

8. A data reproducing method for reproducing moving image data that is captured while a vehicle is traveling, the data reproducing method comprising the steps of:
    (a) deriving, with a controller, a stoppable distance that the vehicle requires to come to a stop based on a speed of the vehicle obtained while the vehicle was traveling during an image-capturing time period in which the moving image data was captured;
    (b) deriving, with the controller, an inter-vehicle distance between the vehicle and a preceding vehicle located ahead of the vehicle during the image-capturing time period in which the moving image data was captured; and
    (c) superimposing, with the controller, on an object image generated from the moving image data, a first mark which shows a position corresponding to the stoppable distance and a second mark which shows a position corresponding to the inter-vehicle distance, wherein
    the step (c) changes a color of the second mark, depending on whether the inter-vehicle distance is greater or smaller than the stoppable distance.

9. The data reproducing method according to claim 8, wherein
    the step (c) changes a form of at least one of the first and second marks depending on whether the inter-vehicle distance is greater or smaller than the stoppable distance.

10. The data reproducing method according to claim 8, further comprising the step of:
    (d) determining, with the controller, whether or not a predetermined event has occurred during the image-capturing time period in which the moving image data was captured, wherein
    in a case where the predetermined event has occurred during the image-capturing time period, the step (c) superimposes the first and second marks on the object image.

11. The data reproducing method according to claim 10, wherein
    the step (c) superimposes, the first and second marks on the object image in at least a predetermined time period before a time point at which the predetermined event occurred.

12. A non-transitory computer-readable recording medium that stores a program to be executed by a computer included in a data reproducing apparatus for reproducing moving image data that is captured while a vehicle is traveling, the program causing the computer to execute the steps of:

(a) deriving a stoppable distance that the vehicle requires to come to a stop based on a speed of the vehicle obtained while the vehicle was traveling during an image-capturing time period in which the moving image data was captured;

(b) deriving an inter-vehicle distance between the vehicle and a preceding vehicle located ahead of the vehicle during the image-capturing time period in which the moving image data was captured; and (c) superimposing, on an object image generated from the moving image data, a first mark which shows a position corresponding to the stoppable distance and a second mark which shows a position corresponding to the inter-vehicle distance, wherein the step (c) changes a color of the second mark, depending on whether the inter-vehicle distance is greater or smaller than the stoppable distance.

13. The recording medium according to claim 12, wherein the step (c) changes a form of at least one of the first and second marks depending on whether the inter-vehicle distance is greater or smaller than the stoppable distance.

14. The recording medium according to claim 12, the program further causing the computer to execute the step of:

(d) determining whether or not a predetermined event has occurred during the image-capturing time period in which the moving image data was captured, wherein in a case where the predetermined event has occurred during the image-capturing time period, the step (c) superimposes the first and second marks on the object image.

15. The recording medium according to claim 12, wherein the step (c) superimposes the first and second marks on the object image in at least a predetermined time period before a time point at which the predetermined event occurred.

\* \* \* \* \*